United States Patent [19]

Sommerfield et al.

[11] Patent Number: 4,720,797
[45] Date of Patent: Jan. 19, 1988

[54] SYSTEM FOR DETECTING JAMS AND OTHER MALFUNCTIONS IN CONTAINER PROCESSING EQUIPMENT

[75] Inventors: John Sommerfield, Los Gatos; Raymond E. Babb, Fremont, both of Calif.

[73] Assignee: Peco Controls Corporation, Milpitas, Calif.

[21] Appl. No.: 735,495

[22] Filed: May 17, 1985

[51] Int. Cl.⁴ ............................................. B65G 43/00
[52] U.S. Cl. .................................... 364/478; 364/185; 198/503; 198/464.4; 198/856
[58] Field of Search ............... 364/468, 478, 184, 185; 198/503, 464.4, 572, 573, 856, 857

[56] References Cited

U.S. PATENT DOCUMENTS 2,547,076  4/1951  Bois ...................................... 364/573
3,927,757 12/1975  Fauth .................................... 198/573

*Primary Examiner*—Jerry Smith
*Assistant Examiner*—Allen MacDonald
*Attorney, Agent, or Firm*—Walter J. Madden, Jr.; Alan H. MacPherson

[57] ABSTRACT

A control system is provided for a processing container line to detect the occurence of a jam or other malfunction within the line. The system compensates for the initialization of the line when a number of containers enter the line before any are discharged therefrom. The system also allows for a tolerable limit on the number of containers which may become "lost" in the processing line without indicating a jam in the line.

7 Claims, 2 Drawing Figures

1

SYSTEM FOR DETECTING JAMS AND OTHER MALFUNCTIONS IN CONTAINER PROCESSING EQUIPMENT

CROSS REFERENCE TO RELATED APPLICATIONS

Copending application Ser. No. 06/527,710, filed Aug. 29, 1983, and assigned to the same assignee as the present application, discloses a system for correlating filled containers with a particular one of a plurality of process stations or pockets in the filling line to aid in locating a malfunctioning pocket in the event that defectively filled containers are detected.

Copending application Ser. No. 06/642,852, filed Aug. 21, 1984, and assigned to the same assignee as the present application, discloses a system for obtaining a quantitative indication of the fill height of containers processed in automated filling equipment by using a collimated radiation source for irradiating each passing container.

BACKGROUND OF THE INVENTION

1. Field of the Invention

This invention relates in general to automatic container processing systems, and relates more particularly to systems for detecting jams or other malfunctions in the flow of containers through such systems.

2. Prior Art

Typically, container filling equipment contains a plurality of filling valves in process stations or pockets for receipt of a corresponding plurality of containers and for simultaneously filling these containers. The filled containers are then delivered to a conveyor for transport to sealing equipment which contains a plurality of sealers or seamers capable of simultaneously sealing a plurality of containers. In accordance with one prior art structure for filling containers, a rotary filling mechanism receives a succession of containers which are to be filled by placing each container in a pocket adjacent a filling valve capable of supplying the material to be placed in the container. After filling, the containers are transferred from the filler to a track and conveyed along the track to a sealer or seamer unit which contains a plurality of stations for sealing each of the containers.

In the operation of such equipment, it is important that the process flow smoothly and in an uninterrupted manner. If a malfunction occurs in the seamer line which results in an interruption or jam in the container flow, the results thereof can be disastrous. Current container processing equipment may operate at rates of 2000 containers per minute or higher, so that a jam of even a relatively short duration can result in the loss of a substantial quantity of filled product, as well as necessitating the shutdown of the processing equipment for cleanup.

One seemingly straightforward approach to jam detection involves counting the number of containers entering and the number leaving the process station and taking appropriate action, such as sounding an alarm or shutting down the process line, or both, if the input count exceeds the output count, presumably indicative of a malfunction or jam in the flow of containers through the process station. However, this approach does not take into account the fact that a certain amount of container loss in the processing system, such as an occasional crushed or broken container, is acceptable; what is to be avoided is a jam which results in a catastrophic loss of product and downtime. Also, this simple approach of comparing the count of containers in and containers out does not accomodate the initialization at starting of the process system where a significant number of containers may enter the system before any are detected at the output.

SUMMARY OF THE INVENTION

In accordance with the present invention, a system is provided for use with a container processing line to provide an indication of a jam or other malfunction in the processing line while accommodating for the initialization of the line at startup and allowing for an adjustable amount of tolerable container loss in the line without indicating the existence of a malfunction.

DESCRIPTION OF THE PREFERRED EMBODIMENT

Figure 1:
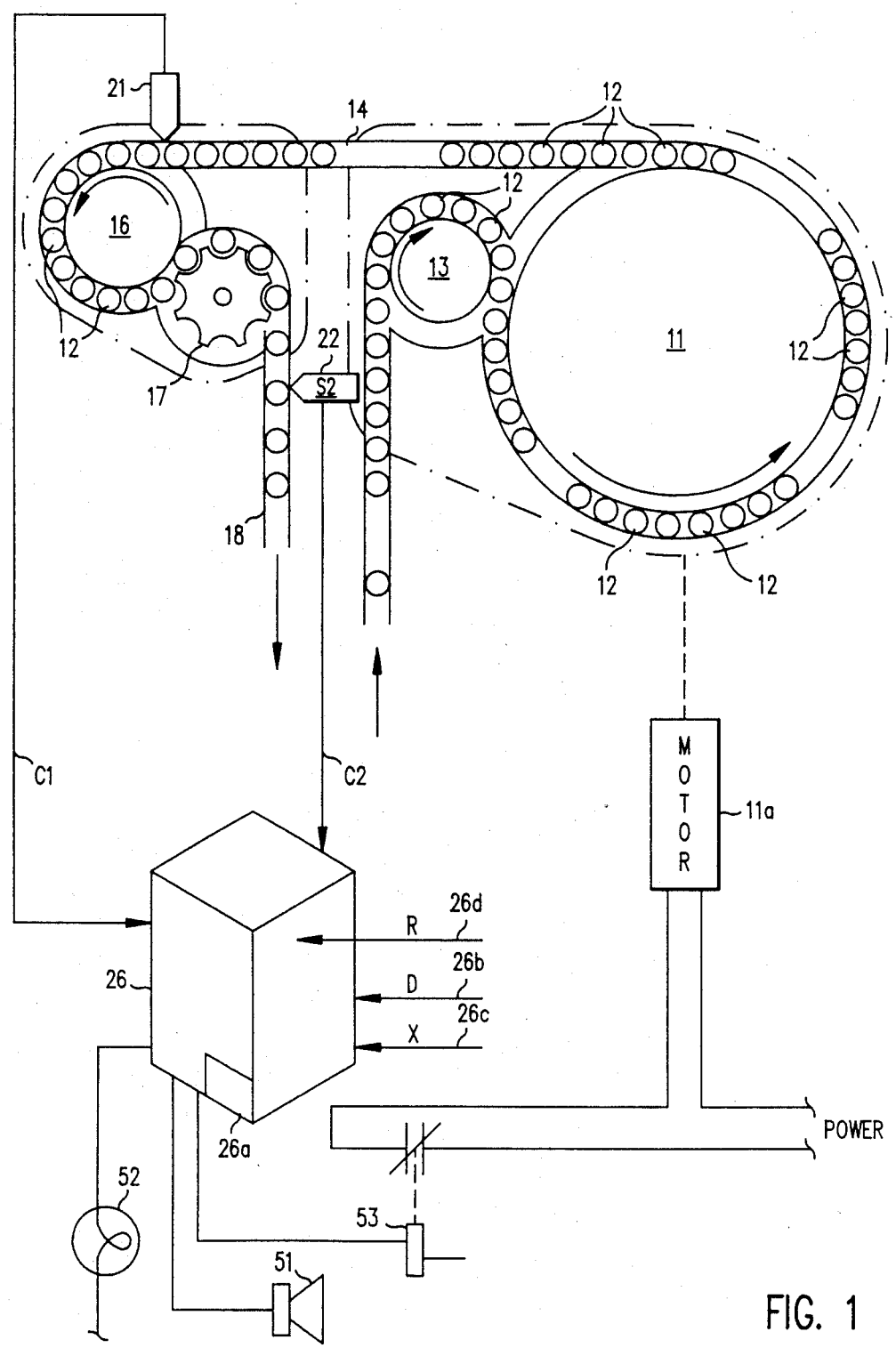
FIG. 1 is a schematic illustration of a container processing system including a container filler and a container seamer or sealer, together with circuitry for implementing the present invention.

The following description refers to a container filling and sealing process line, but it will be understood that the invention is equally applicable to other container processing equipment and the detection of malfunction therein. Referring to FIG. 1, reference numeral 11 designates a container filler mechanism on which a plurality of containers 12 are carried for filling. The empty containers to be filled in filler 11 are supplied by a rotary supply mechanism 13 and deposited on the rotating portion of filler 11. As is well known in the art, filler 11 may contain a number of filler pockets, each of which contains a separate filling valve for filling the container 12 located at that pocket.

After filling, the containers from filler 11 are driven on a track 14 to a sealing or seaming unit 16 where the containers are sealed, such as seaming for metal containers or capping for bottle-type containers. After sealing in unit 16, containers 12 are removed from the seamer by suitable means, such as a well known starwheel mechanism 17 which removes containers 12 and deposits them on a track 18 for further processing. Such further processing may include inspection for container fill height, proper label application, proper cap closure in the case of bottles, and the like.

It is desired to avoid catastrophic container jams between the entry and the exit of unit 16 while permitting a tolerable level of unsatisfactorily sealed containers in that region. In accordance with the present invention, this is accomplished both during initial startup and during normal or full operation. The system of the present invention employs a first container sensor 21 at or near the entry to unit 16 which generates a signal or pulse C1 for each container 12 passing the sensor. The system includes a second sensor 22 disposed at or near the exit of unit 16 which generates a signal or pulse C2 for each normal container exiting unit 16 and starwheel 17 and passing sensor 22. The signals C1 and C2 from sensors 21 and 22, respectively, are supplied to control circuitry 26. Circuitry 26 may include a microprocessor, 26a, such as a Rockwell type 6502, for controlling the operation of the jam detection system in a manner which will be apparent from the flow chart of FIG. 2 to be described below.

It will be seen that when the filler/seamer units shown in FIG. 1 are first started, or when unit 16 has been operated so as to be empty of containers, sensor 21 will generate a number of counts, corresponding to the container capapcity between sensors 21 and 22, before sensor 22 generates its first count. The system of the present invention accommodates this initialization phase of operation in the following manner, with reference to the flow chart of FIG. 2. Assume that D represents the number of container positions between sensors 21 and 22, and that X represents the number of "lost" or nonnormal containers between sensors 21 and 22 which can be tolerated without requiring shutdown of the system. As mentioned above, such lost containers may be the result of crushing or other mishap within unit 16 and are considered an acceptable tradeoff against the throughput benefits of keeping unit 16 operating.

Figure 2:
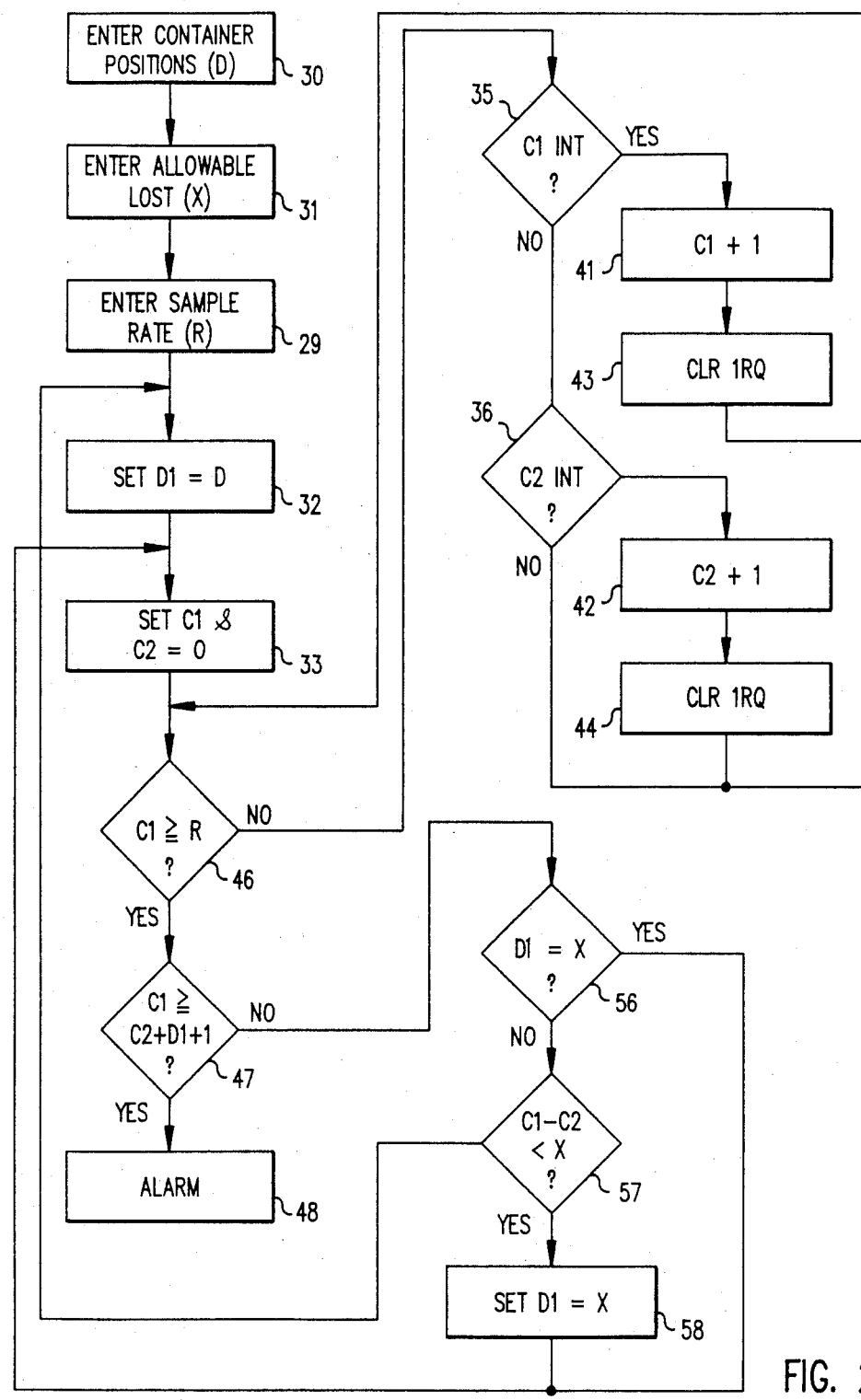
FIG. 2 is a flow chart illustrating the operation of the present invention in both system initialization and normal mode.

For a given unit 16, the value of D is generally fixed by the physical design of the unit, but the present system allows setting of the value of D into control circuitry 26 on a line 26b and as represented by block 30 in FIG. 2, to permit the system to be used with units 16 of a variety of capacities. The value of X is also variable, as represented by input line 26c to circuitry 26, to permit setting this value in dependence on the operating parameters of the particular system.

At initialization, the value of X is set at the desired value, as represented by block 31. The value of D is set equal to D1, as represented in block 32, and assume that the value is 25. The present invention uses an intermittent rather than a continuous sampling and this sampling quantity, represented by R, is adjustable and is preferably a number of containers R which is slightly larger than the number of containers D between sensors S1 and S2. The value of R may be set into control circuitry 26 on a line represented as 26d in FIG. 1 and as block 29 in the flow chart of FIG. 2.

The values of counts C1 and C2 from sensors 21 and 22 are set at zero, as represented by block 33. As the system begins operation, sensor 21 generates a pulse for each container passing thereby. Both sensors 21 and 22 preferably operate in an interrupt mode with microprocessor 26a, to generate an interrupt signal to the microprocessor for each container pulse generated. Upon receipt of an interrupt, microprocessor 26 interrogates sensors 21 and 22 to determine which sensor generated a pulse, as indicated by blocks 35 and 36, and the count from the interrupting sensor is incremented to a counter mechanism. As represented in FIG. 2, the Rockwell 6502 microprocessor contains an X register 41 and a Y register 42, and these registers are a convenient vehicle for accumulating the counts C1 and C2, respectively. After incrementing the proper one of registers 41 and 42 with the C1 or C2 count, the interrupt is cleared, as represented by blocks 43 and 44.

As shown by block 46, the control circuitry 26 including microprocessor 26a interrogates the C1 counter to determine if it has reached a count equal to the value of R or higher, R being the number of containers to be sampled. If the answer is yes, the control circuitry then determines if the count C1 is equal to or greater than the sum of the count C2 plus the value of D1 (which is then equal to the value of D and is assumed in the present example to be 25) plus 1, as represented by block 47. If the answer is yes, this indicates that the number of containers entering unit 16 exceeds the number of containers which have exited unit 16 plus the container capacity of unit 16 plus 1, and that a jam has occured within unit 16. This generates an alarm signal, as represented by block 48. As shown in FIG. 1, this alarm signal may initiate energization of an audible alarm 51, a visual alarm 52 and a cirucit 53 to deenergize drive motor 11a for filler 11 to halt the flow of any further containers into unit 16.

If the answer to the interrogation represented by block 47 is negative, the control circuitry then performs the interrogation represented by block 56 to determine if the value of D1 is equal to the value of X. [the count value C1 is equal to or greater than the value of D1 plus 2.]If the answer to this interrogation is no, [indicating that not enough containers have as yet been supplied to unit 16 to equal its capacity of D1 plus the assumed value of 2 for a tolerable limit for lost containers within the unit,] the interrogation represented by block 57 is performed. This interrogation determines whether the count C1 minus the count C2 is less than X.

The operation of this phase of operation of the present system can best be understood by considering the following example. Assume that sensor 21 has reached a count of 27, equal to the assumed value of R and indicating the passage of 27 containers past that sensor and, under these conditions, block 46 supplies a yes output to block 47, indicating that count C1 is equal to or greater than the value of R. In block 47 the count C1 is compared to the sum of C2 plus D1 plus. In the assumed example, the container capacity $D=D1$ between sensors 21 and 22 is 25. Thus, with a count of 27 for C1, the count for C2 should be 2 so that the compare in block 47 is $27 > 2 + 25 + 1$? This produces a "no" answer to block 56 where the compare of $D1=X$? or $25=2$? is performed. The "no" response to this compare is supplied to block 57 where the compare $C1-C2<X$? or $27-2<2$? is performed. The "no" answer to this compare causes the system to loop back to block 33 where the system is again initialized including the resetting of counts C1 and C2 to zero.

After this resetting, count C1 increases until it again reaches the value of R, 27, at which time it again supplies an output represented as the "yes" line from block 46 to block 47. It will be understood that after the resetting, the count C2 should match count C1 since the system is now full of containers between sensors 21 and 22. Under these conditions, the compare in block 47 of $C1 \geq C2+D1+1$? or $27 \geq 27+25+1$? results in a "no" output to block 56 where the compare $D1=X$? is performed to produce a "no" response.

This response is supplied from block 56 to block 57 where the compare $C1-C2<X$? or $27-27<X$? produces a "yes" response to change the value of D1 from 25(D) to X(2), as represented by block 58, causing the system to loop back to block 33 and reset counts C1 and C2 to zero. This indicates that the portion of the system between sensors 21 and 22 is within one or two containers of the capacity of that portion plus the tolerance of 2 for lost containers.

As mentioned above, in the preferred embodiment of the invention, the control circuitry conducts the operations shown in FIG. 2 on a periodic rather than a continuous basis. The operations may be performed either as a function of container rate or of a number of containers, the only requirement being that the operations continue for a period of time sufficient to insure that the number of containers R counted during a given sampling period exceeds the capacity D (25 in the assumed example).

Although the above example related to the detection of a jam in a container filling/sealing process line, it will be apparent that the invention is applicable to the detection of other malfunctions in a container processing line. For example, in the packaging of canned goods, it is customary to provide some indicia on each can as an indication of the canning date, batch or processing line. Such indicia is often provided by a marking applied to the bottom of each can, and heretofore the only effective way to determine whether the indicia-applying mechanism was functioning properly was to have a human operator remove cans at random from the processing line to visually determine whether the indicia was being properly applied. The present invention may be utilized to address this situation by employing a sensor S2 which will sense the presence or absense of the proper indicia on each can. A normal can would be one having the proper indicia thereon. The remainder of the operation would be as described above for jam detection, with allowance for a tolerable number X of mismarked cans and provision for initialization of the processing line startup.

Thus, the system and method of the present invention are operative to accomodate the initialization period when the processing equipment is being filled up and then to monitor container input and output for providing one or more indications of a jam or other malfunction.

What is claimed is:

1. A method of detecting a malfunction in a container processing system in which said containers sequentially enter a process station and are discharged therefrom after being processed, said process station having a capacity for a first number of said containers at any one time, said method comprising the steps of:

counting the number of said containers entering said process station, counting the number of normal ones of said containers discharged from said process station, comparing the counts of said entering containers and said discharged normal containers, compensating said compared counts for the presence of said first number of containers normally within said process station, additionally compensating said compared counts for a tolerable level of a second number of containers within said process station which are not countable as normal when they are discharged from said process station, utilizing the compensated compared counts to signal an excess of entering containers over discharged containers indicative of a malfunction in said process station; and automatically stopping said processing system upon detection of said malfunction.

2. A method in accordance with claim 1 in which said step of compensating said compared counts for said first number of containers includes incrementing a first counter at the entry of said process station with entering containers to a count of said first number, then comparing the count of said first counter with a third number comprising the count of a second counter counting containers being discharged from said process station plus said first number plus one.

3. A method in accordance with claim 2 including the steps of indicating an alarm condition if the count of said first counter equals or exceeds said third number comprising the count of said second counter plus said first number plus one.

4. A method in accordance with claim 3 including the step of resetting said first and said second counters to zero when the difference between the count of said first counter and said count of said second counter is not less the value of said second number.

5. A method in accordance with claim 3 including the step of setting the value of said first number equal to the value of said second number when said count of said first counter minus said count of said second counter is less than the value of said second number.

6. A method in accordance with claim 5 including the additional step of resetting said first counter and said second counter to zero when said value of said first number is set equal to the value of said second number.

7. A method in accordance with claim 2 in which said first counter and said second counter are operated intermittently rather than continuously.

* * * * *